US008842110B2

(12) United States Patent
Kim et al.

(10) Patent No.: US 8,842,110 B2
(45) Date of Patent: Sep. 23, 2014

(54) ORGANIC LIGHT EMITTING DIODE DISPLAY AND DRIVING METHOD THEREOF

(75) Inventors: Keunchoul Kim, Seoul (KR); Changhoon Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 359 days.

(21) Appl. No.: 13/327,424

(22) Filed: Dec. 15, 2011

(65) Prior Publication Data

US 2012/0161635 A1 Jun. 28, 2012

(30) Foreign Application Priority Data

Dec. 23, 2010 (KR) ........................ 10-2010-0133417

(51) Int. Cl.
*G06F 3/038* (2013.01)
*G09G 5/00* (2006.01)
*G09G 3/32* (2006.01)

(52) U.S. Cl.
CPC ...... *G09G 3/3233* (2013.01); *G09G 2320/0238* (2013.01); *G09G 2320/062* (2013.01); *G09G 2330/00* (2013.01)
USPC .......................................................... 345/211

(58) Field of Classification Search
None
See application file for complete search history.

(56) References Cited

U.S. PATENT DOCUMENTS 7,362,126 B1 * 4/2008 Wert .............................. 326/23
2005/0007307 A1 * 1/2005 Aoki .............................. 345/55
2009/0109147 A1 * 4/2009 Park et al. ...................... 345/76
2010/0123701 A1 * 5/2010 Yeo .............................. 345/211

FOREIGN PATENT DOCUMENTS

CN 1551081 A 12/2004
CN 101425259 A 5/2009
EP 1951005 A1 7/2008
EP 2056282 A2 5/2009
KR 1020070052372 A 5/2007
KR 100894606 B1 4/2009
KR 20100047063 A 5/2010
KR 20100056145 A 5/2010

OTHER PUBLICATIONS

Office Action issued in corresponding United Kingdom Patent Application No. 1122268.4, mailed Apr. 23, 2012.

Office Action issued in corresponding Chinese Patent Application No. 201110447642.2, mailed Dec. 4, 2013, 14 pages.

Office Action issued in corresponding German Patent Application No. 102011056512.4, mailed Oct. 29, 2013, 8 pages.

Office Action issued in corresponding Korean Patent Application No. 10-2010-0133417, mailed Apr. 29, 2014, 6 pages.

* cited by examiner

*Primary Examiner* — Nicholas Lee
(74) *Attorney, Agent, or Firm* — Brinks Gilson & Lione

(57) ABSTRACT

An organic light emitting display device according to the present invention comprises a display unit; a power supply unit; a driving unit including an output buffer generating the reference voltage and applying the reference voltage to the pixels, and generating a current path control signal in a different logic level along with controlling whether to operate the power IC according to an operating mode; and a leakage current cut-off unit switching a current path between the output terminal of the power supply unit and the input terminal of the OLED driving voltage according to the current path control signal.

6 Claims, 5 Drawing Sheets

| | Sleep mode | Display mode |
|---|---|---|
| State | Driving unit ON, Display OFF | Driving unit ON, Display ON |
| CTS | Low | High |

FIG. 6

VBAT=3.7V

| Samples | Sleep mode current(mA) | |
|---|---|---|
| | Prior Art | present Invention |
| 1 | 1.275 | 0 |
| 2 | 0.895 | 0 |
| 3 | 0.918 | 0 |
| 4 | 1.053 | 0 |
| 5 | 0.875 | 0 |

ORGANIC LIGHT EMITTING DIODE DISPLAY AND DRIVING METHOD THEREOF

This application claims the benefit of Korea Patent Application No. 10-2010-0133417 filed on Dec. 23, 2010, which is incorporated herein by reference for all purposes as if fully set forth herein.

BACKGROUND

1. Field

The present disclosure relates to an organic light emitting diode display device capable of cutting off a leakage current.

2. Related Art

Recently, development of various types of flat panel displays (FPDs) is being accelerated. Among others, organic light emitting diode display devices use self-light emitting elements, providing large advantages of fast response time, high light emitting efficiency and brightness, and a large field of view.

An organic light emitting diode display device incorporates organic light emitting diodes as shown in FIG. 1. An organic light emitting diode comprises an organic compound layer. The organic compound layers consists of a hole injection layer (HIL), a hole transport layer (HTL), an emission layer (EML), an electron transport layer (ETL), and an electron injection layer (EIL). If a driving voltage is applied to the anode and the cathode, holes which have passed the hole transport layer (HTL) and electrons which have passed the electron transport layer (ETL) move to the emission layer (EML) and form excitons; and as a result, the emission layer (EML) generates visible light.

An organic light emitting diode display device arranges pixels including organic light emitting diodes as described above in the form of a matrix and controls brightness of the pixels according to the gray scale of video data.

Organic light emitting diode display devices are getting great attention as display devices for mobile applications. An organic light emitting diode display device employed for mobile applications comprises a power supply unit 1, a display unit 2, and a driving unit 3 as shown in FIG. 2.

The power supply unit 1 is equipped with a power IC P-IC. The power IC P-IC receives a battery power VBAT through an input terminal Vin and by using the battery power VBAT, generates an OLED driving voltage VDD_OLED applied to the display unit 2.

The display unit 2 comprises a plurality of pixels, each of which consisting of 6T1C (i.e., six TFTs and one capacitor). Individual pixels are built to have such a structure that prior to a programming stage, a gate node N1 of a driving TFT DT is initialized by a reference voltage VREF applied from the driving unit 3 at the initialization stage.

The driving unit 3 provides pixel data to data lines of the display unit 2, scan signals SCANs to the gate lines of the display unit 2, and emission signals EMs to the emission lines of the display unit 2. The driving unit 3 activates the power IC P-IC by applying an enable signal EN to the power supply unit 1 at a display mode while deactivating the power IC P-IC by applying a disable signal DIS to the power supply unit 1 at a sleep mode. The sleep mode is intended for reducing power consumption of mobile applications, indicating an operation mode where display is temporarily turned off when no input is received from the user for a predetermined time period. The driving unit 3 is in normal operation at the sleep mode. The driving unit 3 generates the reference voltage VREF and applies the reference voltage to the display unit 2. The driving unit 3 is equipped with an output buffer to generate the reference voltage VREF. The output buffer comprises a first PMOS switch PMT1 and a first NMOS switch NMT1 connected in series between a power voltage Vs and the ground.

The gate block of the first PMOS switch PMT1 and the first NMOS switch NMT1 are all in a floating state (i.e., Hi-Z stage).

A true shutdown function is excluded from the power IC P-IC for the purpose of reducing power consumption and increasing efficiency. The true shutdown function denotes automatically cutting off the battery power VBAT applied to the input terminal Vin of the power IC P-IC inside the power IC P-IC when the disable signal DIS is applied from the driving unit 3 or a system (not shown). The power IC P-IC excluding the true shutdown function is unable to cut off the leakage current due to the battery voltage VBAT from being applied to the display unit 2 in a disable state. In this regard, the organic light emitting diode display device further comprises a second NMOS switch NMT2 between and the ground and the cathode of an organic light emitting diode (OLED) formed in the display unit 2. As the second NMOS switch NMT2 is turned off according to a current path control signal CTS from the driving unit 3, a current path between an input load of the power IC P-IC and the display unit 2 is blocked and thus, generation of a leakage current is prevented.

On the other hand, during the initialization stage, since TFTs of pixels are all turned on according to the scan signal SCAN and the emission signal EM, a leakage current may develop along the path shown in FIG. 2 for an organic light emitting diode display device initializing a gate node N1 of the driving TFT (DT) through the reference voltage VREF generated at the driving unit 3, even if the second NMOS switch NMT2 is staying in a turn-off state. The amount of the leakage current increases in proportion to a potential difference between the input terminal of an OLED driving voltage VDD_OLED and the reference voltage VREF output terminal of the driving unit 3.

SUMMARY

An organic light emitting display device comprises a display unit including an organic light emitting diode emitting light due to a driving current flowing between an input terminal of an OLED driving voltage and the ground and a driving TFT controlling the driving current according to a gate-source voltage, a plurality of pixels being disposed in the display unit where a gate node of the driving TFT is initialized to a reference voltage for a predetermined time period; a power supply unit including a power IC generating the OLED driving voltage to be applied to the display unit based on the input battery voltage; a driving unit including an output buffer generating the reference voltage and applying the reference voltage to the pixels and generating current path control signal in a different logic level along with controlling whether to operate the power IC according to an operating mode; and a leakage current cut-off unit switching a current path between the output terminal of the power supply unit and the input terminal of the OLED driving voltage according to the current path control signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 illustrates a simulation result of the amount of leakage current in a sleep mode compared with that of a prior art.

DETAILED DESCRIPTION OF THE ILLUSTRATED EMBODIMENTS

Hereinafter, preferred embodiments of the present invention will be described in detail with reference to FIGS. 3 to 6.

Figure 1:
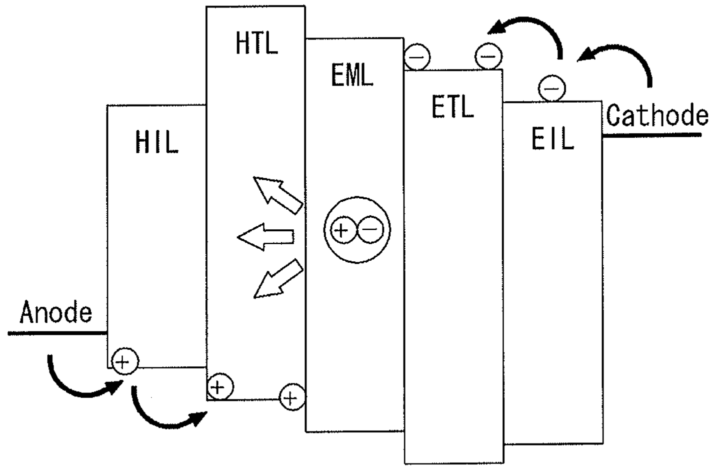
FIG. 1 (RELATED ART)
FIG. 1 illustrates a light emitting principle of a conventional organic light emitting diode.
Figure 2:
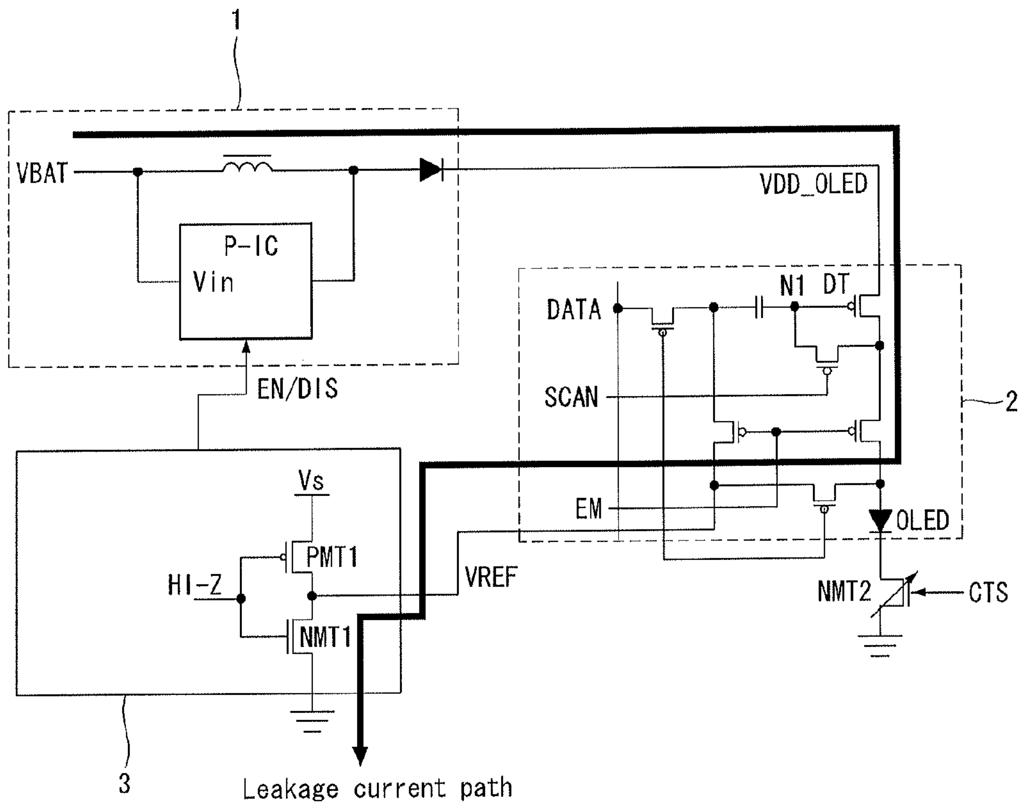
FIG. 2 (RELATED ART)
FIG. 2 illustrates a conventional organic light emitting diode display device used for mobile applications.
Figure 3:
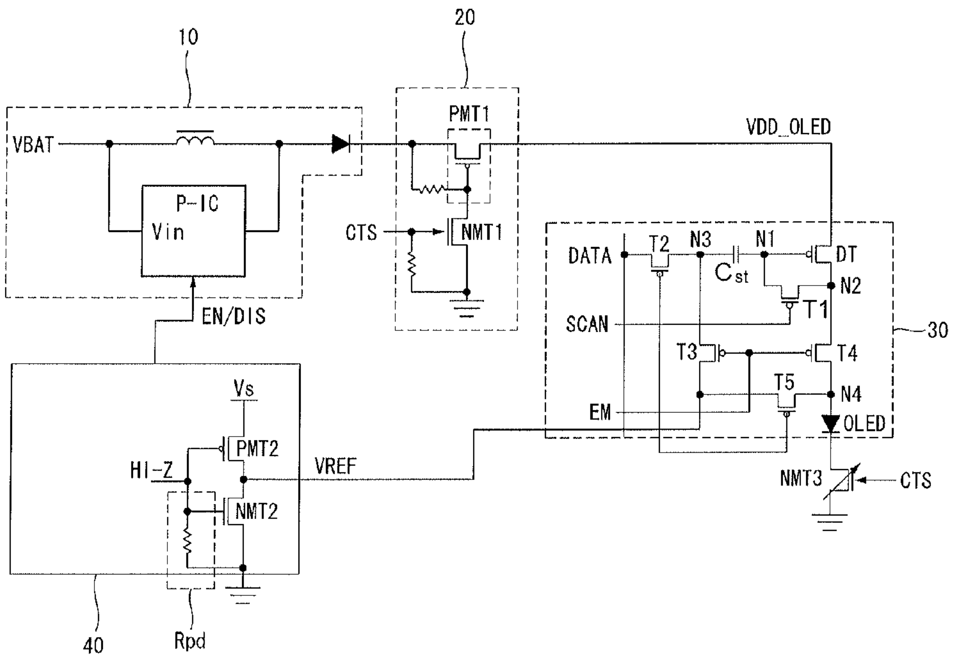
FIG. 3 illustrates an organic light emitting diode display device used for mobile applications.
Figures 4, 5:
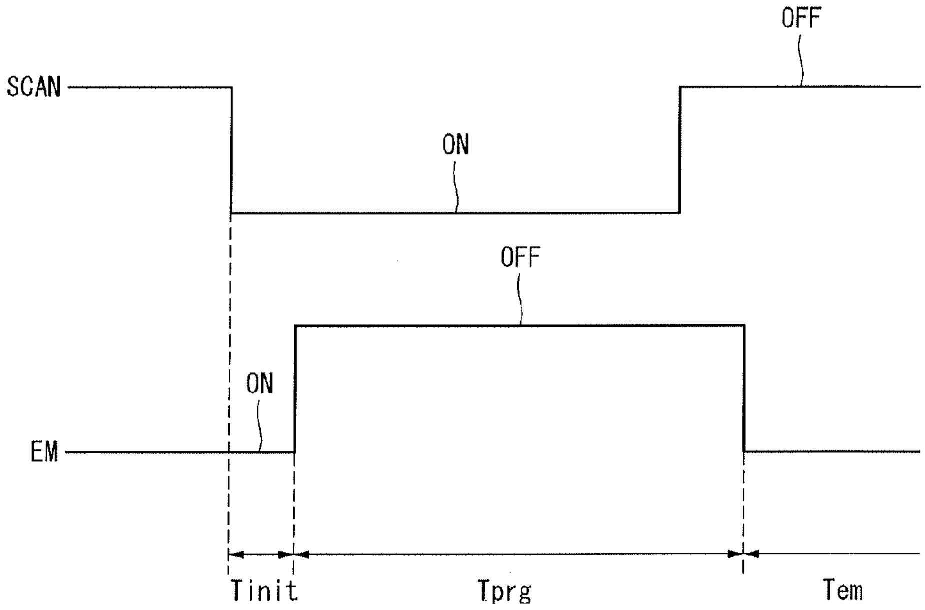
FIG. 4 illustrates a timing diagram of driving waveforms applied to pixels.
FIG. 5 illustrates an operating state in a sleep and a display mode and a logic level of a current path control signal.

FIG. 3 illustrates an organic light emitting diode display device according to the present invention used for mobile applications. FIG. 4 illustrates a timing diagram of driving waveforms applied to pixels. FIG. 5 illustrates an operating state in a sleep and a display mode and a logic level of a current path control signal.

With reference to FIG. 3, an organic light emitting diode display device according to an embodiment of the present invention comprises a power supply unit 10, a leakage current cut-off unit 20, a display unit 30, and a driving unit 40.

A power supply unit 10 includes a power IC P-IC. A power IC P-IC receives a battery power VBAT through an input terminal Vin and based on the battery power VBAT, generates an OLED driving voltage VDD_OLED to be applied to the display unit 30.

The display unit 30 includes a plurality of pixels driven according to the OLED driving voltage VDD_OLED received from the power supply unit 10. Each of the pixels is connected to a data line through which pixel data are supplied, a gate line through which a scan signal is supplied, and an emission line through which an emission signal is supplied. Individual pixels are built to have such a structure that a node to which a gate electrode of a driving TFT is connected is initialized to a reference voltage VREF input from the driving unit 40.

As an example, each pixel can comprise an organic light emitting diode (OLED), a driving TFT (DT), a first to a fifth switch TFT (T1~T5), and a storage capacitor Cst.

The driving TFT (DT) provides a driving current fed from an input terminal of the OLED driving voltage VDD_OLED to an organic light emitting diode (OLED) and controls the driving current by using a gate-source voltage. The gate electrode of the driving TFT (DT) is connected to a first node N1. A source electrode of the driving TFT (DT) is connected to an input terminal of the OLED driving voltage VDD_OLED and a drain electrode of the driving TFT is connected to a second node N2.

A first switch TFT T1 switches on and off a current path between the first node N1 and the second node N2 in response to a scan signal SCAN. The gate electrode of the first switch TFT T1 is connected to the gate line. The source electrode of the first switch TFT T1 is connected to the first node N1 and the drain electrode of the first switch TFT T1 is connected to the second node N2.

A second switch TFT T2 switches on and off a current path between a data line and a third node N3 in response to a scan signal SCAN. The gate electrode of the second switch TFT T2 is connected to the gate line. The source electrode of the second switch TFT T2 is connected to the data line and the drain electrode of the second switch TFT T2 is connected to the third node N3.

A third switch TFT T3 switches on and off a current path between a third node N3 and a reference voltage VREF output terminal of the driving unit 40 in response to an emission signal EM. The gate electrode of the third switch TFT T3 is connected to the emission line. The source electrode of the third switch TFT T3 is connected to the third node N3 and the drain electrode of the third switch TFT T3 is connected to the reference voltage VREF output terminal of the driving unit 40.

A fourth switch TFT T4 switches on and off a current path between the second node N2 and a fourth node N4 in response to the emission signal EM. The gate electrode of the fourth switch TFT T4 is connected to the emission line. The source electrode of the fourth switch TFT T4 is connected to the second node N2 and the drain electrode of the fourth switch TFT T4 is connected to the fourth node N4.

A fifth switch TFT T5 switches on and off a current path between the reference voltage VREF output terminal of the driving unit 40 and the fourth node N4 in response to the scan signal SCAN. The gate electrode of the fifth switch TFT T5 is connected to the gate line. The source electrode of the fifth switch TFT T5 is connected to the fourth node N4 and the drain electrode of the fifth switch TFT T5 is connected to the reference voltage VREF output terminal of the driving unit 40.

A storage capacitor Cst is connected between the first node N1 and the third node N3 and maintains the gate voltage of the driving TFT (DT).

PON For each of the pixels, the gate node of the driving TFT (DT), namely, the first node N1 is initialized to the reference voltage VREF during an initialization period Tinit as shown in FIG. 4. And during a programming period Tprg, which follows the initialization period, the potential of the first node N1 is programmed into a data voltage where a threshold voltage of the driving TFT (DT) is compensated. Next, during a light emitting period, which succeeds the programming period Tprg, an organic light emitting diode (OLED) is made to emit light by controlling a driving current flowing into the organic light emitting diode (OLED) based on the programmed potential of the first node N1.

The leakage current cut-off unit 20 switches on and off a current path between the output terminal of the power supply unit 10 and the input terminal of OLED driving voltage VDD_OLED of the display unit 30 according to a current path control signal CTS. The leakage current cut-off unit 20 comprises a first PMOS switch PMT1 connected between the output terminal of the power supply unit 10 and the input terminal of the OLED driving voltage VDD_OLED; and a first NMOS switch NMT1 switching on and off a current path between the gate electrode of the first PMOS switch PMT1 and the ground according to the current path control signal CTS. If the first NMOS switch NMT1 is turned on, the first PMOS switch PMT1 is also turned on. Likewise, if the first NMOS switch NMT1 is turned off, the first PMOS switch PMT1 is turned off accordingly.

The driving unit 40 provides pixel data (DATA) to the data lines of the display unit 30; the scan signal SCAN to the gate lines of the display unit 30; and the emission signal EM to the emission lines of the display unit 30. As shown in FIG. 5, the driving unit 40 turns on the display state by activating the power IC P-IC by supplying an enable signal (EN) to the power supply unit 10 in the display mode and turns off the display state by deactivating the power IC P-IC by supplying an disable signal (DIS) to the power supply unit 10 in the sleep mode. The sleep mode is intended for reducing power consumption of a mobile application and specifies an operating mode where the display state is temporarily turned off when no input is received from the user for a predetermined time period. While the power IC P-IC is deactivated in the sleep mode, the driving unit 40 carries out normal operation. The driving unit 40 generates the current path control signal CTS with a different logic level in the sleep mode and the display mode. The current path control signal CTS is generated in a low logic level in the sleep mode while the current path control signal CTS is generated in a high logic level in the display mode.

The driving unit 40 generates the reference voltage VREF and provides the reference voltage VREF to the display unit 30. The driving unit 40 is equipped with an output buffer to generate the reference voltage VREF. The output buffer includes a second PMOS switch PMT2 and a second NMOS switch NMT2 connected to each other in series between the power voltage Vs and the ground. Both the gate electrode of the second PMOS switch PMT2 and the gate electrode of the second NMOS switch NMT2 are connected to a floating node Hi-Z. A pull-down resistor Rpd is connected between the floating node Hi-Z and the ground. The pull-down resistor Rpd prevents a gate potential of the second NMOS switch NMT2 from floating, thereby turning off the second NMOS switch NMT2 definitely.

Meanwhile, a third NMOS switch NMT3 is installed between the cathode of the organic light emitting diode (OLED) and the ground. The third NMOS switch NMT3 switches on and off a current path between the cathode of the organic light emitting diode (OLED) and the ground according to the current path control signal CTS. The third NMOS switch NMT3 is turned off in the sleep mode, cutting off the current path between the cathode of the organic light emitting diode (OLED) and the ground while turned on in the display mode, allowing the current path between the cathode of the organic light emitting diode (OLED) and the ground.

The operation of cutting off a leakage current in an organic light emitting diode display device of the present invention having a structure as above will be described in detail in the following.

A true shutdown function is excluded from the power IC P-IC of the present invention for the purpose of reducing power consumption and increasing efficiency. The true shutdown function denotes automatically cutting off the battery power VBAT applied to the input terminal Vin of the power IC P-IC inside the power IC P-IC when the disable signal DIS is applied from the driving unit 40 (or a system). The power IC P-IC excluding the true shutdown function is unable to cut off the leakage current due to the battery voltage VBAT from being applied to the display unit 30 in a disable state.

Therefore, as shown in FIG. 5, the present invention, by turning off the first PMOS switch PMT1 and the first NMOS switch NMT1 of the leakage current cut-off unit 20 while turning off the third NMOS switch NMT3 by generating the current path control signal CTS of low level (L) in the sleep mode where the power IC P-IC is in a disable state, cuts off the current path between a power IC P-IC input load and the display unit 30, thereby preventing a leakage current from being applied to the display unit 30.

Furthermore, the present invention, by definitely turning off the second NMOS switch NMT2 by applying a pull-down resistor Rpd connected between the gate electrode of the second NMOS switch NMT2 constituting an output buffer in the driving unit 40 and the ground, a leakage current path is additionally cut off during the initialization period Tint where the scan signal SCAN and the emission signal EM are all maintained to be on-state as shown in FIG. 4, in particular.

Meanwhile, based on the fact that the amount of leakage current increases in proportion to a potential difference between the input terminal of OLED driving voltage VDD_OLED and the reference voltage VREF output terminal of the driving unit 40, the present invention can additionally cut off a leakage current path by eliminating the potential difference by controlling the power voltage Vs, which is used to generate a reference voltage VREF in the sleep mode where the power IC P-IC is in a disable state, to have the same level as the OLED driving voltage VDD_OLED.

FIG. 6 illustrates a simulation result of the amount of leakage current in a sleep mode in comparison with that of a prior art. In FIG. 6, a battery power source VBAT of 3.7 V is used for simulation.

With reference to FIG. 6, in the sleep mode, the leakage current from the prior art was measured to be 1.275 mA for sample 1; 0.895 mA for sample 2; 0.918 mA for sample 3; 1.053 mA for sample 4; and 0.875 mA for sample 5.

However, the leakage current in the sleep mode according to the present invention was measured to be 0 mA for all cases independently of samples. As can be seen from the simulation result, the present invention can definitely cut off a leakage current in the sleep mode.

As described in detail above, an organic light emitting diode display device according to the present invention definitely cuts off a leakage current in the sleep mode where a power IC is disabled, thereby reducing unnecessary power consumption.

Throughout the description, it should be understood for those skilled in the art that various changes and modifications are possible without departing from the technical principles of the present invention. Therefore, the technical scope of the present invention is not limited to those detailed descriptions in this document but should be defined by the scope of the appended claims.

What is claimed is:

1. An organic light emitting display device, comprising:

a display unit including a plurality of pixels having an organic light emitting diode (OLED) emitting light due to a driving current flowing between an input terminal of an OLED driving voltage and a ground terminal, and a driving thin-film transistor (TFT) controlling the driving current according to a gate-source voltage, a gate node of the driving TFT being initialized to a reference voltage for a predetermined time period;

a power supply unit including a power integrated chip (IC) generating the OLED driving voltage to be applied to the display unit based on an input battery voltage;

a driving unit including an output buffer generating the reference voltage and applying the reference voltage to the pixels, and generating a current path control signal in a different logic level along with controlling whether to operate the power IC according to an operating mode; and a leakage current cut-off unit switching a current path between an output terminal of the power supply unit and the input terminal of the OLED driving voltage according to the current path control signal, wherein the current path control signal controls both the current path between the power supply unit and the display unit and a current path between the OLED and the ground terminal.

2. The device of claim 1, wherein the driving unit generates the current path control signal at a high logic level along with activating operation of the power IC by applying an enable signal to the power supply unit at a display mode; and generates the current path control signal at a low logic level along with deactivating operation of the power IC by applying a disable signal to the power supply unit at a sleep mode.

3. The device of claim 2, wherein the leakage current cut-off unit comprises a first PMOS switch connected between the output terminal of the power supply unit and the input terminal of the OLED driving voltage; and a first NMOS switch switching on and off a current path between a gate electrode of the first PMOS switch and the ground terminal according to the current path control signal.

4. The device of claim 2, wherein the output buffer includes a second PMOS switch and a second NMOS switch connected to each other in series between a power voltage terminal for supplying a power voltage and the ground terminal; and both the gate electrode of the second PMOS switch and the gate electrode of the second NMOS switch are connected to a floating node and a pull-down resistor is connected between the floating node and the ground terminal to prevent a gate potential of the second NMOS switch from floating.

5. An organic light emitting display device, comprising:

a display unit including a plurality of pixels having an organic light emitting diode (OLED) emitting light due to a driving current flowing between an input terminal of an OLED driving voltage and a ground terminal, and a driving thin-film transistor (TFT) controlling the driving current according to a gate-source voltage, a gate node of the driving TFT being initialized to a reference voltage for a predetermined time period;

a power supply unit including a power integrated chip (IC) generating the OLED driving voltage to be applied to the display unit based on an input battery voltage;

a driving unit including an output buffer generating the reference voltage and applying the reference voltage to the pixels, and generating a current path control signal in a different logic level along with controlling whether to operate the power IC according to an operating mode; and a leakage current cut-off unit switching a current path between the output terminal of the power supply unit and the input terminal of the OLED driving voltage according to the current path control signal, wherein the driving unit generates the current path control signal at a high logic level along with activating operation of the power IC by applying an enable signal to the power supply unit at a display mode, and generates the current path control signal at a low logic level along with deactivating operation of the power IC by applying a disable signal to the power supply unit at a sleep mode, wherein a third NMOS switch, switching of which is controlled according to the current path control signal, is connected between cathode of the organic light emitting diode and the ground terminal; and the third NMOS switch is turned off in the sleep mode in response to the current path control signal at the low logic level.

6. The device of claim 4, wherein the power voltage of the output buffer and the driving voltage of the OLED have the same level in the sleep mode.

* * * * *